United States Patent
Wang et al.

(10) Patent No.: US 11,114,841 B2
(45) Date of Patent: Sep. 7, 2021

(54) DC PLC PV RAPID SHUTDOWN DEVICE CIRCUIT BASED ON SUNSPEC COMMUNICATION PROTOCOL

(71) Applicant: ZHEJIANG JMTHY PHOTOVOLTAIC TECHNOLOGY CO., LTD, Ningbo (CN)

(72) Inventors: Weihui Wang, Cixi (CN); Xiangchun Deng, Jiaxing (CN)

( * ) Notice: Subject to any disclaimer, the term of this patent is extended or adjusted under 35 U.S.C. 154(b) by 0 days.

(21) Appl. No.: 16/882,805

(22) Filed: May 26, 2020

(65) Prior Publication Data

US 2021/0184458 A1 Jun. 17, 2021

(30) Foreign Application Priority Data

Dec. 13, 2019 (CN) .......................... 201911282810.X

(51) Int. Cl.
- *H02H 7/20* (2006.01)
- *H02S 40/34* (2014.01)
- *H02J 3/38* (2006.01)
- *H02J 13/00* (2006.01)

(52) U.S. Cl.
CPC ............... *H02H 7/20* (2013.01); *H02J 3/381* (2013.01); *H02J 13/00006* (2020.01); *H02S 40/34* (2014.12); *H02J 2300/24* (2020.01)

(58) Field of Classification Search
CPC .......... H02S 40/34; H02S 40/32; H02S 40/36; H02S 40/38; H02J 13/00006; H02J 3/381; H02J 3/383; H02J 3/385
USPC .................................... 307/78, 80, 82, 85, 64
See application file for complete search history.

(56) References Cited

U.S. PATENT DOCUMENTS

| | | | |
|---|---|---|---|
| 10,230,310 B2* | 3/2019 | Loewenstern | H02M 7/48 |
| 2016/0190798 A1* | 6/2016 | Narla | H02J 3/381 |
| | | | 307/80 |
| 2017/0170782 A1* | 6/2017 | Yoscovich | H02H 1/0015 |
| 2017/0207620 A1* | 7/2017 | Zhu | H01L 31/02021 |
| 2017/0346295 A1* | 11/2017 | Yoscovich | H02S 50/10 |
| 2017/0353150 A1* | 12/2017 | Alon | H02G 3/16 |
| 2018/0097354 A1* | 4/2018 | Yoscovich | H02J 3/383 |
| 2018/0287389 A1* | 10/2018 | Yu | H02J 3/38 |
| 2019/0207653 A1* | 7/2019 | Bieber | H04B 3/56 |
| 2020/0164755 A1* | 5/2020 | Smolenaers | H02J 7/022 |
| 2020/0235583 A1* | 7/2020 | Eizips | H02M 1/32 |
| 2020/0303949 A1* | 9/2020 | Pauletti | H01L 31/02021 |

* cited by examiner

*Primary Examiner* — Nguyen Tran
*Assistant Examiner* — Jagdeep S Dhillon
(74) *Attorney, Agent, or Firm* — W&K IP

(57) ABSTRACT

A PV module, which includes PV+ and PV− output ports. An output capacitor Cout is connected to PV+ or PV− port through an electric switch. One end of a power inductor L1 is connected to OUT−, and the other end is grounded. The power inductor L1 is connected with a resonant capacitor C1 and an impedance resistor R2 in parallel. One end of a blocking capacitor C2 is used as the PLC+ port, one end of a blocking capacitor C3 is used as the PLC− port, and signal sources are connected to OUT+ and OUT− in parallel and send "Keep Alive" signals based on SunSpec communication protocol. PLC+ port and PLC− port are connected to a signal coupling input port of a control IC, and the control IC controls the electric switch. When the signal is decoded and extracted, the electric switch will remain on, otherwise it will be off.

11 Claims, 2 Drawing Sheets

DC PLC PV RAPID SHUTDOWN DEVICE CIRCUIT BASED ON SUNSPEC COMMUNICATION PROTOCOL

TECHNICAL FIELD

The invention relates to the PV technology field, specifically to a DC PLC PV rapid shutdown device circuit based on SunSpec communication protocol.

BACKGROUND ART

As a renewable and pollution-free energy, solar energy has attracted more and more attention. At the same time, with the progress of power electronic technology, PV grid-connected power generation technology has been able to develop rapidly. PV power generation system has a number of PV modules connected in series to form PV module string, and then connects the PV module string to the inverter to realize conversion of DC to AC so as to realize grid-connected power generation. Considering that the PV modules connected in series will form a DC high voltage of 600V-1000V, which will lead to personal danger and fire accidents, the PV power generation system is required to achieve a rapid shutdown at the module level in case of emergency.

For the above reasons, it is very important to realize the rapid shutdown of each module in the PV power station. Currently, the common practice is to connect the shutdown device outside each module. In case of emergency, this device can quickly disrupt the connection between PV modules, thus eliminating the DC high voltage in the PV module array system, reducing the risk of electric shock and solving the rescue risk. In order to realize shutdown of the system, the common practices are wireless communication and wire communication.

Wireless communication is much affected by the interference of field environment, which easily causes data packet dropout and affects the reliability of communication, resulting in the problem of faulty shutdown or failure to shut off. However, there are many ways to realize wired communication. The traditional practice is to use RS485 serial port communication. Although this method can solve the problem of poor reliability of wireless communication, it is necessary to add communication cables, so that the cost is high and it is not easy to install.

CONTENTS OF THE INVENTION

In light of the defects in the prior art, the invention provides a DC PLC PV rapid shutdown device circuit based on SunSpec communication protocol, to realize rapid shutdown of PV module through PLC communication by using "Keep Alive" signal based on SunSpec communication protocol.

A DC PLC PV rapid shutdown device circuit based on SunSpec communication protocol comprises a PV module, which includes PV+ and PV− output ports;

The DC PLC PV rapid shutdown device circuit comprises an output capacitor Cout, one end of the output capacitor Cout is connected to PV+ or PV− port through an electric switch, the other end of the output capacitor Cout is connected to PV− or PV+ port, two ends of the output capacitor Cout are respectively connected to OUT+ and OUT−, and PV− is grounded;

The DC PLC PV rapid shutdown device circuit comprises an power inductor L1, one end of the power inductor L1 is connected to OUT−, and the other end is grounded. The power inductor L1 is connected with a resonant capacitor C1 and an impedance resistor R2 in parallel. The DC PLC PV rapid shutdown device circuit comprises a blocking capacitor C2 and a blocking capacitor C3, one end of the blocking capacitor C2 is used as the PLC+ port, and the other end of the blocking capacitor C2 is connected to a ground terminal of the power inductor L1; one end of the blocking capacitor C3 is used as the PLC− port, and the other end of the blocking capacitor C3 is connected to one end where the power inductor L1 is connected with OUT−;

Signal sources are connected to OUT+ and OUT− in parallel and send "Keep Alive" signals based on SunSpec communication protocol;

The DC PLC PV rapid shutdown device circuit also comprises a control IC, PLC+ port and PLC− port are connected to a signal coupling input port of the control IC, the signal control terminal of the control IC is connected with the electric switch to control the electric switch, and PV+ is connected with the control IC and supplies power to the control IC.

Further, the DC PLC PV rapid shutdown device circuit also comprises an input capacitor Cin, which is connected to PV+ and PV− ports in parallel.

Further, the DC PLC PV rapid shutdown device circuit also comprises a free-wheeling diode D1, one end of the free-wheeling diode D1 is connected to a circuit where the output capacitor Cout is connected with OUT+, and the other end of the free-wheeling diode D1 is connected to a circuit where the power inductor L1 is grounded.

Further, the DC PLC PV rapid shutdown device circuit also comprises a dummy load R1, one end of the dummy load R1 is connected to a circuit where the output capacitor Cout is connected with OUT+, and the other end of the dummy load R1 is connected to a circuit where the power inductor L1 is grounded.

Further, the DC PLC PV rapid shutdown device circuit also comprises a drive circuit, the electric switch comprises MOSFETs S1 and S2, the MOSFETs S1 and S2 are connected in series to a circuit where PV+ is connected with the output capacitor Cout, a drive end Drv2 of the drive circuit is connected with a gate pole of the MOSFET S2, and a drive end Drv1 of the drive circuit is connected with a gate pole of the MOSFET S1; the signal terminal of the control IC is connected with the drive circuit; PV+ is connected to the control IC and the drive circuit and supplies power to the control IC and the drive circuit.

Further, the DC PLC PV rapid shutdown device circuit also comprises a drive circuit, the electric switch comprises MOSFETs S1 and S2, the MOSFETs S1 and S2 are connected in series to a circuit where PV− is connected with the output capacitor Cout, a drive end Drv2 of the drive circuit is connected with a gate pole of the MOSFET S2, and a drive end Drv1 of the drive circuit is connected with a gate pole of the MOSFET S1; the signal terminal of the control IC is connected with the drive circuit; PV+ is connected to the control IC and the drive circuit and supplies power to the control IC and the drive circuit.

Further, the capacitance of the blocking capacitor C2 is equal to that of the blocking capacitor C3.

Further, the signal source is an inverter or a signal generator, and the signal packet of the "Keep alive" signal is transmitted at a fixed interval; the signal packet includes AC signals with two different frequencies of 131.25 KHz and 143.75 KHz.

Further, the conversion relation between the power inductor L1 and the resonant capacitor C1 is shown below:

$$f = \frac{1}{2\pi\sqrt{L1C1}},;$$

Wherein, f is 143.75 KHz, and L1 is 0.5-1 μh;

The resistance of impedance resistor R2 is 1Ω.

Further, the DC PLC PV rapid shutdown device circuit also comprises an auxiliary power supply, which is connected to PV+, is connected with the control IC and the drive circuit and supplies power to the control IC and the drive circuit.

The invention has the beneficial effects that the invention comprises a PV module, which comprises PV+ and PV− output ports, an output capacitor Cout is connected to PV+ or PV− port through an electric switch; one end of a power inductor L1 is connected to OUT−, and the other end is grounded; the power inductor L1 is connected with a resonant capacitor C1 and an impedance resistor R2 in parallel. One end of a blocking capacitor C2 is used as the PLC+ port, one end of a blocking capacitor C3 is used as the PLC− port, and signal sources are connected to OUT+ and OUT− in parallel and send "Keep Alive" signals based on SunSpec communication protocol; PLC+ port and PLC− port are connected to a signal coupling input port of a control IC, and the control IC controls the electric switch. When in use, "Keep Alive" signal is transmitted to the control IC through coupling of LC oscillating circuit, the control IC decodes the signal to control shutdown of the electric switch; when the signal is decoded and extracted, the electric switch will remain on, otherwise it will be off.

DESCRIPTION OF DRAWINGS

In order to more clearly describe the specific embodiment of the invention or the technical proposal in the prior art, the drawings to be used in the description of embodiments or prior art are briefly described below. In all drawings, similar components or parts are generally identified by similar drawing marks. In the drawings, the components or parts are not necessarily drawn to the actual scale.

EMBODIMENTS

The embodiments for the technical proposal of the utility model will be described in detail in combination with the drawings below. The following embodiments are intended only to illustrate the technical proposal of the utility model more clearly; therefore, they are used only as examples and cannot be used to limit the scope of protection of the utility model.

It should be noted that the technical terms or scientific terms used in this application shall have the general meaning understood by technicians in the field to which the utility model belongs unless otherwise stated.

Figure 1:
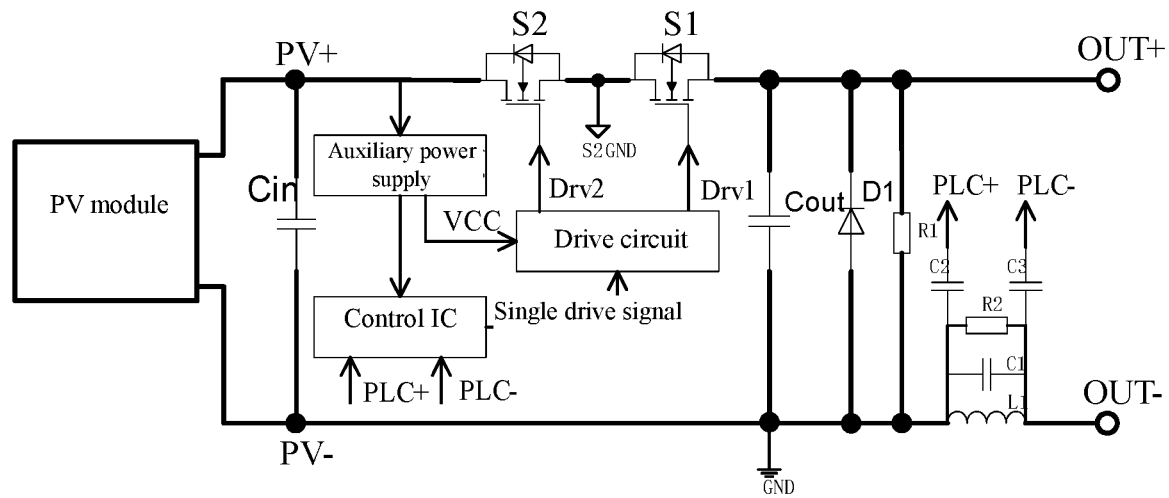
FIG. 1 is the circuit diagram for a single PV module shutdown circuit provided by the invention.

As shown in FIG. 1, a DC PLC PV rapid shutdown device circuit based on SunSpec communication protocol comprises a PV module, which comprises PV+ and PV− output ports; the DC PLC PV rapid shutdown device circuit comprises an output capacitor Cout, one end of the output capacitor Cout is connected to PV+ or PV− port through an electric switch, the other end of the output capacitor Cout is connected to PV− or PV+ port, two ends of the output capacitor Cout are respectively connected to OUT+ and OUT−; OUT+ and OUT− are used as the electric output terminals, and PV− is grounded; the DC PLC PV rapid shutdown device circuit comprises a power inductor L1, one end of the power inductor L1 is connected to OUT−, and the other end thereof is grounded; the power inductor L1 is connected with a resonant capacitor C1 and an impedance resistor R2 in parallel; the DC PLC PV rapid shutdown device circuit comprises a blocking capacitor C2 and a blocking capacitor C3, one end of the blocking capacitor C2 is used as the PLC+ port, and the other end of the blocking capacitor C2 is connected to a ground terminal of the power inductor L1; one end of the blocking capacitor C3 is used as the PLC− port, and the other end of the blocking capacitor C3 is connected to the end where the power inductor L1 is connected with OUT−; signal sources are connected to OUT+ and OUT− in parallel and send AC "Keep Alive" signals based on SunSpec communication protocol; the DC PLC PV rapid shutdown device circuit also comprises a control IC, PLC+ port and PLC− port are connected to a signal coupling input port of the control IC, a signal control terminal of the control IC is connected with the electric switch to control the electric switch, and PV+ is connected with the control IC and supplies power to the control IC.

Figure 2:
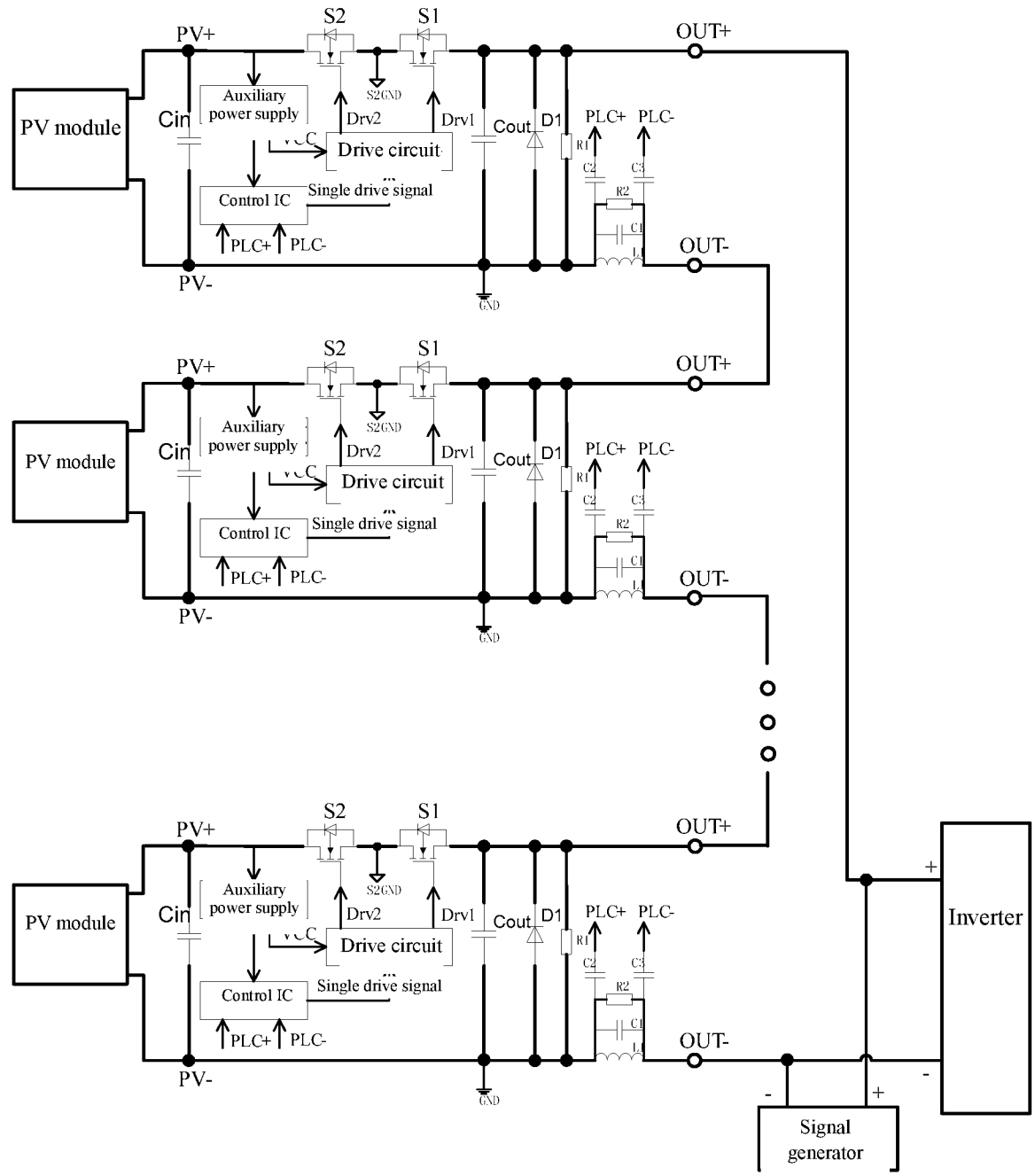
FIG. 2 is the circuit diagram after multiple PV module shutdown circuits are connected in parallel.

FIG. 2 is the structure diagram after multiple PV modules are interconnected. The whole structure shown in FIG. 1 constitutes a single PV module shutdown circuit. OUT+ can be connected with OUT− of other single PV module shutdown circuit, and OUT− can be connected with OUT+ of other single PV module, so that multiple PV modules are interconnected.

When the utility model is in use, the Power Line Communication (PLC) scheme is adopted to transmit "Keep Alive" signals, which are input from OUT−, pass through OUT−, the power inductor L1, the output capacitor Cout and OUT+ in sequence and are output from OUT+. When the electrical switch controlling the output power of the PV module is turned on, some "Keep Alive" signals are shunted, pass through PV−, PV+ and the electric switch in sequence and are output from OUT+. After being output from OUT+, "Keep Alive" signals can be input into OUT− of other PV module shutdown circuit, so as to form series "Keep Alive" signal transmission in multiple PV module shutdown circuits;

The function of output capacitor Cout is as follows: when the electric switch is turned off, namely, the output of PV+ and PV− is disconnected, the output capacitor Cout can continuously make "Keep Alive" signals pass through itself, so that "Keep Alive" signals can pass through the PV module shutdown circuit and then enter other PV module shutdown circuit for the control IC to get the signal. For example, when the electrical switch of a PV module shutdown circuit is turned off (by human or accidentally), "Keep Alive" signals input from OUT− still pass through this PV module shutdown circuit after passing through the output capacitor Cout, and enter other PV module shutdown circuit after being output from OUT+ of this PV module shutdown circuit, so that the PV module shutdown circuit turned off will not block "Keep Alive" signals; at the same time, the output capacitor Cout can suppress the voltage ripple;

When "Keep Alive" signals sent from the signal source pass through LC oscillating circuit composed of the power inductor L1 and the resonant capacitor C1, LC oscillating circuit will extract "Keep Alive" signals by coupling, and the signals enters into the control IC as PLC+ port and PLC− port after passing through the blocking capacitors C2 and C3 (the blocking capacitors can isolate DC signals through AC signals) in differential mode. The control IC will decode "Keep Alive" signals based on SunSpec protocol to get the on-off action to control the shutdown of the electric switch. The control IC can judge whether there is a "Keep Alive" signal in the circuit. If the signal is detected, the circuit will keep on; otherwise, it will be turned off. The function of impedance resistor R2 is impedance matching, so that the impedance of the shutdown device meets the requirements of SunSpec protocol;

When the PV module has a fault (e.g. DC high voltage), the electric switch is turned off after "Keep Alive" signals are input, so that the electrical output of OUT+ and OUT− for the PV module can be turned off quickly, so as to realize the shutdown control mode based on the PLC communication mode of SunSpec protocol. In addition, when one or several PV module shutdown circuits are disconnected, "Keep Alive" signals will still flow through Cout and be transmitted to other PV module shutdown circuit.

Meanwhile, the utility model also has the following advantages:

(1) PLC signal anti-interference ability is very strong, the signal communication is stable, and the reliability is high;
(2) "Keep Alive" signals are extracted by coupling through LC oscillating circuit, so as to form DC PLC communication and demodulation. DC PLC is used for communication and demodulation, so that the circuit is simple, and the cost is low;
(3) The DC PLC PV rapid shutdown device circuit meets the communication protocol for the PV rapid shutdown system of SunSpec Alliance and can communicate with any device having this protocol to serve rapid shutdown function.

The DC PLC PV rapid shutdown device circuit also comprises an input capacitor Cin, which is connected to PV+ and PV− ports in parallel. The input capacitor Cin can store a certain amount of electricity and suppress the voltage ripple.

The DC PLC PV rapid shutdown device circuit also comprises a free-wheeling diode D1, one end of the free-wheeling diode D1 is connected to a circuit where the output capacitor Cout is connected with OUT+, and the other end of the free-wheeling diode D1 is connected to a circuit where the power inductor L1 is grounded, so that when the electrical switch of a PV module shutdown circuit is turned off (by human or accidentally), "Keep Alive" signals input from OUT− still pass through this PV module shutdown circuit after passing through free-wheeling diode D1, and enter other PV module shutdown circuit after being output from OUT+ of this PV module shutdown circuit, so that the PV module shutdown circuit turned off will not block "Keep Alive" signals.

The DC PLC PV rapid shutdown device circuit also comprises a dummy load R1, one end of the dummy load R1 is connected to a circuit where the output capacitor Cout is connected with OUT+, and the other end of the dummy load R1 is connected to a circuit where the power inductor L1 is grounded. During the turnoff process of electric switch, the dummy load R1 can ensure quicker discharge speed of Cout.

The DC PLC PV rapid shutdown device circuit also comprises a drive circuit, the electric switch comprises MOSFETs S1 and S2, the MOSFETs S1 and S2 are connected in series to a circuit where PV+ is connected with the output capacitor Cout, a drive end Drv2 of the drive circuit is connected with a gate pole of the MOSFET S2, and a drive end Drv1 of the drive circuit is connected with a gate pole of the MOSFET S1; the signal terminal of the control IC is connected with the drive circuit; PV+ is connected to the control IC and the drive circuit and supplies power to the control IC and the drive circuit. Two MOSFETs are connected in series as the turnoff switch, thereby effectively improving the system reliability, preventing high voltage output due to damage to single MOSFET S1 or S2, and avoiding personal safety risks.

The following changed embodiment can also be adopted: the DC PLC PV rapid shutdown device circuit also comprises a drive circuit, the electric switch comprises MOSFETs S1 and S2, the MOSFETs S1 and S2 are connected in series to a circuit where PV− is connected with the output capacitor Cout, a drive end Drv2 of the drive circuit is connected with a gate pole of the MOSFET S2, and a drive end Drv1 of the drive circuit is connected with a gate pole of the MOSFET S1; the signal terminal of the control IC is connected with the drive circuit; PV+ is connected to the control IC and the drive circuit and supplies power to the control IC and the drive circuit, i.e. the MOSFET switches S1 and S2 of the main circuit are moved from the high side to the low side.

The drive circuits in the two embodiments mentioned above can be driven by a general MOSFET drive chip or a general MOSFET drive circuit sold on the market.

Preferably, the capacitance values of blocking capacitor C2 and blocking capacitor C3 are equal to obtain the control signal by differential calculation.

Specifically, the signal source is an inverter or a signal generator, and the signal packet of the "Keep alive" signal sent by the signal generator or inverter is transmitted at a fixed interval. In general, the method for realizing rapid shutdown is that the control IC judges whether there is a "Keep Alive" signal in the circuit. If the signal is detected, the circuit will keep on; otherwise, it will be turned off. The signal packet includes AC signals with two different frequencies of 131.25 KHz and 143.75 KHz. 131.25 khz is called mark frequency, and 143.75 khz is called space frequency, which is the required frequency of SunSpec communication protocol.

The conversion relation between the power inductor L1 and the resonant capacitor C1 is shown below:

$$f = \frac{1}{2\pi\sqrt{L1C1}};$$

Wherein, f is 143.75 khz (the frequency of AC signal with a frequency of 143.75 khz in the component signal packet of "Keep Alive" signal based on the SunSpec communication protocol), and L1 is 0.5-10; the inductance of power inductor L1 cannot be too high. If the inductance is too high, the inductor DCR will become larger and the loss will be large, which will affect the working efficiency. At the same time, if the inductance is too high, the size of the inductor will become larger under the same working current, which is not conducive to the small-scale integration of the product. If the inductance is too low, the value of the matched resonant capacitor C1 will be correspondingly high. Too high capacitance of C1 is not conducive to the type selection.

For example, when L1 is 560 nH, $$f = \frac{1}{2\pi\sqrt{L1C1}} =$$

$$\frac{1}{2\pi\sqrt{560 \times 10^{-9} \times C1}} = 143.75 \text{ KHz} \Rightarrow C1 \approx 2.19 \times 10^{-6} F;$$

The resistance of impedance resistor R2 is preferably assumed as 1Ω to meet the impedance requirements of SunSpec signal receiver.

Preferably, the DC PLC PV rapid shutdown device circuit also comprises an auxiliary power supply, which is connected to PV+, is connected with the control IC and the drive circuit and supplies power to the control IC and the drive circuit to ensure the power supply of drive circuit and control IC. Even if the PV module becomes faulty and cannot supply power, the auxiliary power supply can supply power to the drive circuit and the control IC. The auxiliary power supply can be power supply with power storage function, which can get power from and be charged by PV+ of the PV module.

Finally, it should be noted that the above embodiments are used only to describe the technical proposal of the utility model, not to limit it. Notwithstanding the detailed description of the utility model by reference to the foregoing embodiments, the general technicians in the field should understand that they may modify the technical proposal as recorded in the foregoing embodiments, or make equivalent substitutions for part or all of the technical features. Such modifications or substitutions should not remove the essence of the corresponding technical proposal from the scope of the technical proposal of each embodiment in the utility model; instead, it should be covered within the scope of the claims and specification of the utility model.

The invention claimed is:

1. A DC PLC PV rapid shutdown device circuit based on SunSpec communication protocol comprises a PV module, which comprises PV+ and PV− output ports, wherein the DC PLC PV rapid shutdown device circuit is based on SunSpec communication protocol is characterized in that: the DC PLC PV rapid shutdown device circuit comprises an output capacitor Cout, one end of the output capacitor Cout is connected to PV+ or PV− port through an electric switch, the other end of the output capacitor Cout is connected to PV− or PV+ port, two ends of the output capacitor Cout are respectively connected to OUT+ and OUT−, and PV− is grounded;

the DC PLC PV rapid shutdown device circuit comprises a power inductor L1, one end of the power inductor L1 is connected to OUT−, and the other end thereof is grounded;

the power inductor L1 is connected with a resonant capacitor C1 and an impedance resistor R2 in parallel;

the DC PLC PV rapid shutdown device circuit comprises a blocking capacitor C2 and a blocking capacitor C3, one end of the blocking capacitor C2 is used as the PLC+ port, and the other end of the blocking capacitor C2 is connected to a ground terminal of the power inductor L1;

one end of the blocking capacitor C3 is used as the PLC− port, and the other end of the blocking capacitor C3 is connected to the end where the power inductor Li is connected with OUT−; and signal sources are connected to OUT+ and OUT− in parallel and send "Keep Alive" signals based on Sun-Spec communication protocol;

wherein the DC PLC PV rapid shutdown device circuit also comprises a control IC, PLC+ port and PLC− port are connected to a signal coupling input port of the control IC, a signal control terminal of the control IC is connected with the electric switch to control the electric switch, and PV+ is connected with the control IC and supplies power to the control IC.

2. A DC PLC PV rapid shutdown device circuit based on SunSpec communication protocol according to claim 1 is characterized in that the DC PLC PV rapid shutdown device circuit also comprises an input capacitor Cin, which is connected to PV+ and PV− ports in parallel.

3. A DC PLC PV rapid shutdown device circuit based on SunSpec communication protocol according to claim 2 is characterized in that the DC PLC PV rapid shutdown device circuit also comprises a free-wheeling diode D1, one end of the free-wheeling diode D1 is connected to a circuit where the output capacitor Cout is connected with OUT+, and the other end of the free-wheeling diode D1 is connected to a circuit where the power inductor L1 is grounded.

4. A DC PLC PV rapid shutdown device circuit based on SunSpec communication protocol according to claim 3 is characterized in that the DC PLC PV rapid shutdown device circuit also comprises a dummy load R1, one end of the dummy load R1 is connected to a circuit where the output capacitor Cout is connected with OUT+, and the other end of the dummy load R1 is connected to a circuit where the power inductor L1 is grounded.

5. A DC PLC PV rapid shutdown device circuit based on SunSpec communication protocol according to claim 4 is characterized in that the DC PLC PV rapid shutdown device circuit also comprises a drive circuit, the electric switch comprises MOSFETs S1 and S2, the MOSFETs S1 and S2 are connected in series to a circuit where PV+ is connected with the output capacitor Cout, a drive end Drv2 of the drive circuit is connected with a gate pole of the MOSFET S2, and a drive end Drv1 of the drive circuit is connected with a gate pole of the MOSFET S1; the signal terminal of the control IC is connected with the drive circuit; PV+ is connected to the control IC and the drive circuit and supplies power to the control IC and the drive circuit.

6. A DC PLC PV rapid shutdown device circuit based on SunSpec communication protocol according to claim 4 is characterized in that the DC PLC PV rapid shutdown device circuit also comprises a drive circuit, the electric switch comprises MOSFETs S1 and S2, the MOSFETs S1 and S2 are connected in series to a circuit where PV− is connected with the output capacitor Cout, a drive end Drv2 of the drive circuit is connected with a gate pole of the MOSFET S2, and a drive end Drv1 of the drive circuit is connected with a gate pole of the MOSFET S1; the signal terminal of the control IC is connected with the drive circuit; PV+ is connected to the control IC and the drive circuit and supplies power to the control IC and the drive circuit.

7. A DC PLC PV rapid shutdown device circuit based on SunSpec communication protocol according to claim 5 is characterized in that the capacitance of the blocking capacitor C2 is equal to that of the blocking capacitor C3.

8. A DC PLC PV rapid shutdown device circuit based on SunSpec communication protocol according to claim 7 is characterized in that the signal source is an inverter or a signal generator, and the signal packet of the "Keep alive" signal is transmitted at a fixed interval; the signal packet includes AC signals with two different frequencies of 131.25 KHz and 143.75 KHz.

9. A DC PLC PV rapid shutdown device circuit based on SunSpec communication protocol according to claim 8 is characterized in that the conversion relation between the power inductor L1 and the resonant capacitor C1 is shown below:

$$f = \frac{1}{2\pi\sqrt{L1C1}};$$

wherein, f is 143.75 KHz, and L1 is 0.5-10;
the resistance of impedance resistor R2 is 152.

10. A DC PLC PV rapid shutdown device circuit based on SunSpec communication protocol according to claim 9 is characterized in that the DC PLC PV rapid shutdown device circuit also comprises an auxiliary power supply, which is connected to PV+, is connected with the control IC and the drive circuit and supplies power to the control IC and the drive circuit.

11. A DC PLC PV rapid shutdown device circuit based on SunSpec communication protocol according to claim 6 is characterized in that the capacitance of the blocking capacitor C2 is equal to that of the blocking capacitor C3.

\* \* \* \* \*